United States Patent [19]

Aihara

[11] Patent Number: 4,607,931
[45] Date of Patent: Aug. 26, 1986

[54] EXPOSURE CONTROL CIRCUIT FOR A CAMERA HAVING A LOAD CIRCUIT

[75] Inventor: Yoshihiko Aihara, Kanagawa, Japan

[73] Assignee: Canon Kabushiki Kaisha, Tokyo, Japan

[21] Appl. No.: 676,545

[22] Filed: Nov. 30, 1984

[30] Foreign Application Priority Data

Dec. 2, 1983 [JP] Japan .................................. 58-228684
Dec. 2, 1983 [JP] Japan .................................. 58-228685

[51] Int. Cl.$^4$ .............................................. G03B 7/08
[52] U.S. Cl. ...................................... 354/400; 354/460; 354/484; 354/412; 354/173.11
[58] Field of Search ............... 354/400, 402, 406, 407, 354/408, 484, 173.1, 173.11, 412, 458, 460

[56] References Cited

U.S. PATENT DOCUMENTS

| | | | |
|---|---|---|---|
| 4,278,337 | 7/1981 | Mashimo | 354/412 |
| 4,363,544 | 12/1982 | Nemoto et al. | 354/412 |
| 4,387,975 | 6/1983 | Araki | 354/407 |
| 4,426,144 | 1/1984 | Kawazoe | 354/173.1 |
| 4,460,265 | 7/1984 | Mashimo et al. | 354/484 |
| 4,482,236 | 11/1984 | Tsuzuki et al. | 354/412 |
| 4,509,843 | 4/1985 | Hasegawa | 354/412 |

Primary Examiner—Russell E. Adams
Attorney, Agent, or Firm—Toren, McGeady, Stanger, Goldberg & Kiel

[57] ABSTRACT

A camera having a common electrical power source for the light metering circuit and either the range finding circuit or the lens drive motor. The output of the light metering circuit which occurs when the range finding circuit or the lens drive motor transits from unenergization to energization is prohibited from being used for automatically controlling exposure.

11 Claims, 9 Drawing Figures

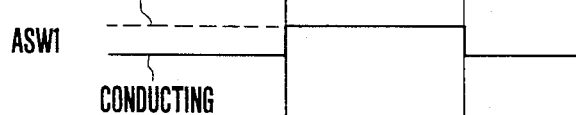
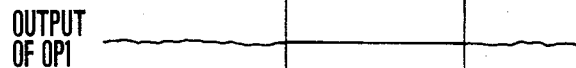
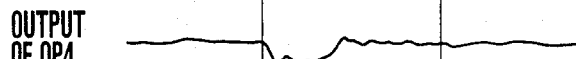
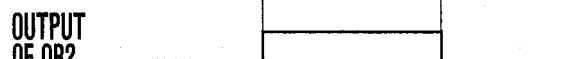
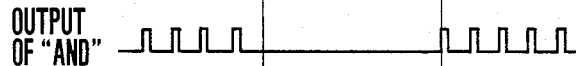

EXPOSURE CONTROL CIRCUIT FOR A CAMERA HAVING A LOAD CIRCUIT

BACKGROUND OF THE INVENTION

1. Field of the Invention

This invention relates to cameras in which the light metering circuit and either the range finding circuit or the electric motor for driving motion of the lens are supplied with electrical power from the same source.

2. Description of the Prior Art

In conventional cameras it has been the common practice that the photographer, while aligning the camera with an object to be photographed, pushes down the shutter release button a first stroke, the light metering circuit is rendered operative with the display of the object brightness information, or the exposure value, i.e. shutter time, or aperture value, within the finder and/or on the camera housing, letting him known what setting the camera is adjusted to. The range finding circuit, too, simultaneously starts to operate, determining whether the plane of the object image just coincides with the film plane, or if it does not coincide it is shifted forward or rearward therefrom, which is also displayed as in-focus, near focus, or far focus, within the finder.

In conventional cameras of the character described above, however, focusing is automated by using an AF motor. When the electrical power source of the AF motor is common with that of the light metering circuit, because the actual voltage of the electrical power source is temporarily lowered by the rush current at the start of current supply to the AF motor, it often results that the output of the light metering circuit was lowered as the battery voltage lowered, or that noise entered the output of the light metering circuit.

Similarly, for the conventional camera which operates with selection of the auto-focus mode where the range finding circuit is energized, and the visual focus mode where the range finding circuit is unenergized so that the distance adjusting ring of the photographic lens is manually moved as in ordinary cameras, because the switching of the mode selector from the auto to the visual mode results in rush current flowing to the range finding circuit, when it occurs during light metering as the shutter button is held in the first stroke, the drawback was that the light metering circuit was badly influenced so that the displayed value was erroneous, or photographs of incorrect exposure were obtained.

With such drawbacks in mind, it is a first object of the present invention to prohibit automatic exposure from being performed based on that output of the light metering circuit which is obtained when the voltage of the electrical power source for the light metering circuit abruptly changes.

A second object of the invention is to prohibit the automatic exposure operation from being performed based on that light value which is obtained from the light metering circuit when the range finder circuit starts to be supplied with electrical power.

A third object of the invention is to prohibit the automatic exposure operation from being performed based on that light value which is obtained from the light metering circuit when a supply of electrical power to the electric motor for driving the lens starts.

SUMMARY OF THE INVENTION

A camera including AE means for performing automatic exposure control based on a light metering output obtained by performing light metering, an electric motor for driving motion of a photographic lens of the camera, an electrical power source circuit for supplying electrical power to the AE means and the mtoro, control means for controlling the supply of electrical power to the motor from the electrical power source circuit, and prohibiting means for prohibiting the automatic exposure control operation of the AE means based on the light metering output when the supply of electrical power from the electrical power source circuit to the motor by the control means is initiated.

BRIEF DESCRIPTION OF THE DRAWINGS

FIGS. 2A, 2B and 2C are charts illustrating the waveforms of the outputs of the main portions of the circuit of FIG. 1.

FIGS. 4A, 4B, 4C and 4D are charts of waveforms of the outputs of the main portions of the circuit of FIG. 3.

DETAILED DESCRIPTION OF THE PREFERRED EMBODIMENTS

Figure 1:
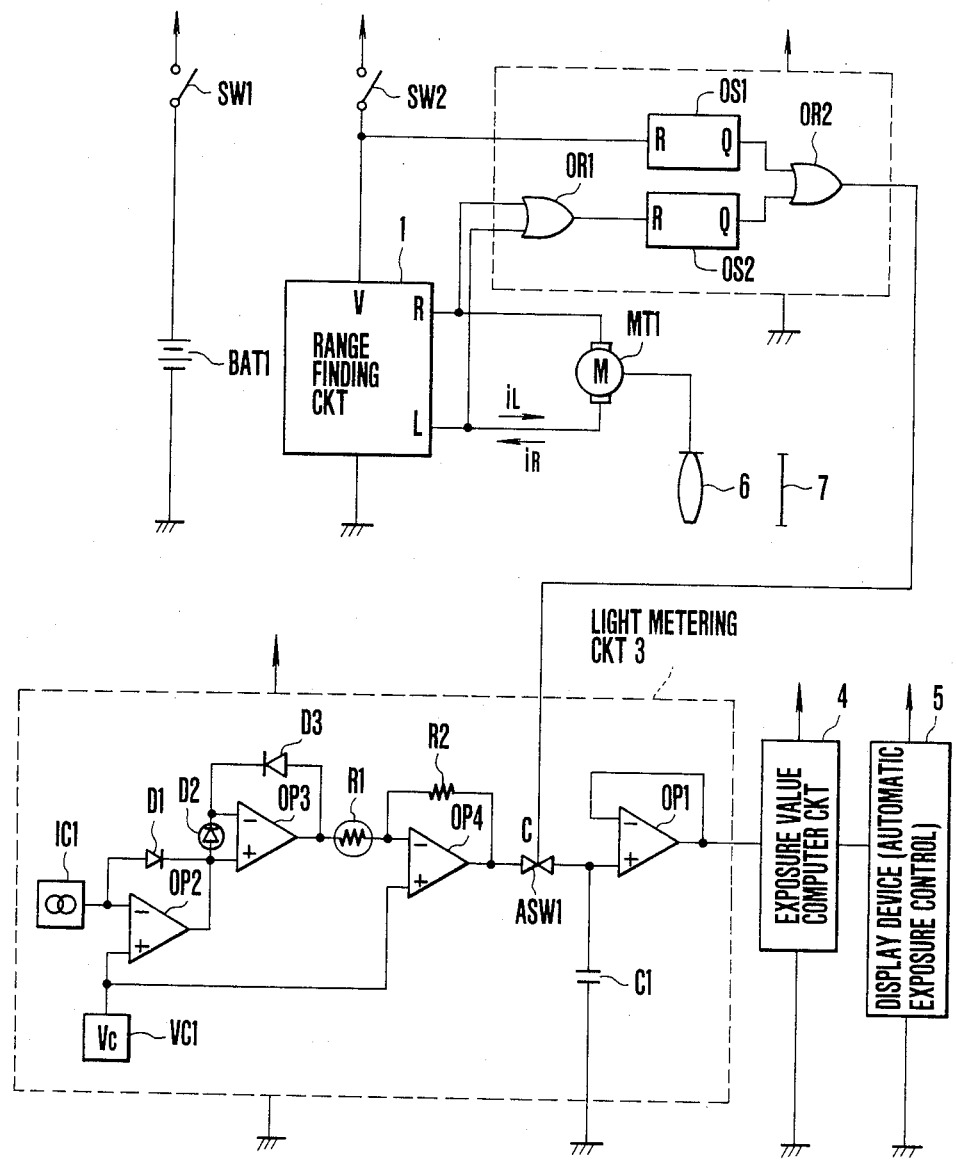
FIG. 1 is an electrical circuit diagram of an embodiment of the present invention applied to the camera in which the light metering circuit produces an output in the analog form.

In FIG. 1 there is shown the circuitry of an embodiment of an auto-focus camera according to the invention wherein the output of the light metering circuit is latched in analog form. A range finding circuit 1, responsive to the focusing condition of a photographic lens 6, controls the operation of an AF electric motor MT1. In more detail, when the image plane of the photographic lens 6 lies to the left of a film plane 7, a high level signal is produced at an output line labeled R, and when to the right of the film plane 7, it is produced at another output line labeled L. When a sharp image is focused just on the film plane 7, the output lines R and L are each at a low level. The R and L output lines are connected to respective inputs of an OR gate OR1 and also to the AF motor MT1. The positive terminal of an electrical power source or battery BAT1 is connected to the various portions of the circuit of FIG. 1 through a power supply control switch SW1 which is turned on when a shutter button (not shown) is depressed a first stroke. The power supply to the range finding circuit 1 is controlled by a mode selector switch SW2. When the switch SW2 is turned on by the photographer, the camera is switched from the manual to the autofocus mode. Monostable multi-vibrators OS1 and OS2 (hereinafter referred to as "one-shot") each, responsive to a rise in the signal from L to H level at the input terminal R produce a pulse of prescribed duration. Applied to the R input terminal of the first one-shot OS1 is the signal of the switch SW2. Applied to the R input terminal of the second one-shot OS2 is the output of the OR gate OR1. The Q output terminals of the one-shots OS1 and OS2 are connected to respective inputs of an OR gate OR2. The circuit comprised of the OR gates OR1 and OR2 and the one-shots OS1 and OS2 is supplied with electrical power when the switch SW1 is ON.

A light metering circuit 3, of which the construction is known except for an anlog switch ASW1, comprises a constant voltage source VC1 having an output connected to non-inverting input terminals of operational amplifiers OP2 and OP4, a constant current source IC1, a temperature compensation diode D1 constituting a bias source for a photo diode D2 together with the operational amplifier OP2, an operational amplifier OP3 constituting a current-to-voltage converter circuit together with a logarithmic compression diode D3, a resistor R2 connected in the feedback path of the operational amplifier OP4 or buffer, a posister R1, the analog switch ASW1 which becomes non-conducting when an H level signal enters its C terminal, and conducting when an L level signal enters, a condenser C1 and an operational amplifier OP1 constituting a buffer.

An exposure value computer circuit 4, receptive of the output voltage of the operational amplifier OP1, produces an output representing the required shutter time or aperture for automatically producing a proper exposure.

A display device 5 associated with an automatic exposure control mechanism (not shown) displays the computed exposure value, i.e. shutter time or aperture value by the exposure value computer circuit 4 and automatically controls the exposure operation of the camera on the basis of the output of the exposure value computer circuit 4. Note, the range finder circuit 1, the exposure value computer circuit 4 and the display device 5 are known in the art.

The operation of the circuit of FIG. 1 is described below by reference to FIGS. 2A, 2B and 2C. FIG. 2A is the waveform of the output of the operational amplifier OP4 constituting the output stage of the light metering circuit 3. FIG. 2B is the wave form of the gating control signal applied to the input C of the analog ASW1. FIG. 2C is the wave form of the output of the operational amplifier OP1. T1 represents a point in time at which the analog switch ASW1 turns off, and T2 a point in time at which the analog switch ASW1 turns on.

Since the photographer has not yet pushed down the shutter button, when the switch SW1 is OFF and, since the manual mode is set, when the mode changeover switch SW2 is OFF, no electrical power is supplied to all the circuits. Then, when the photographer depresses the shutter button a first stroke, the switch SW1 is turned on. All the circuits except the range finding circuit 1 an supplied with electrical power, and operation of the light metering circuit 3 is initiated. A photo current of an intensity proportional to the brightness of an object to be photographed flows to the photo diode D2. This photo current is converted to a voltage of logarithmically compressed magnitude by the operational amplifier OP3 and the diode D3, while the reverse-saturation current of the diode D3 is cancelled by applying the output of the temperature compensation circuit or diode D1 to the non-inverting input of the operational amplifier OP3, since the characteristic of the diode D1 is the same as that of the diode D3. Therefore, the operational amplifier OP3 produces an output in the form of a voltage proportional to the logarithm of the object brightness and the absolute temperature. By processing this voltage through the posister R1, the resistor R2 and, operational amplifier OP4, the logarithm of the object brightness which is independent from the temperature is obtained at the output of the operational amplifier OP4. The condenser C1 is charged through the analog switch ASW1 by the output of the operational amplifier OP4 to a voltage proportional to the object brightness and independent from the temperature. The voltage on the condenser C1, after having been voltage-followed by the operational amplifier OP1, is applied to the exposure value computer circuit 4. The exposure value computer circuit 4 computes the applied voltage value with the preset values of other exposure factors to produce an output respresenting a shutter time value or aperture which gives the proper exposure of the photographic film. The display device 5 shows the computed value of the shutter time or aperture, and makes the proper exposure.

Then, when the mode selector switch SW2 is turned on to supply electrical power to the range finding circuit 1, the voltage of the battery BAT1 is temporarily changed, causing the waveform output of the operational amplifier OP4 to be disturbed as shown in FIG. 2A. At the same time, the signal at the input terminal R of the one-shot OS1 is changed from L to H level. Therefore, the one-shot OS1 produces a pulse which becomes H level for a prescribed time from T1 to T2 shown in FIGS. 2A to 2C. This pulse is applied through the OR gate OR2 to the analog switch ASW1 at the C input terminal thereof. During this time, therefore, the analog switch ASW1 is non-conducting. It should be noted that the condenser C1 was charged to that output of the operational amplifier OP4 which occurred just before the analog switch ASW1 becomes non-conducting. Therefore, the condenser C1 holds that output without being affected by the disturbed output of the operational amplifier OP4. This assures that even when the shutter button is depressed a second stroke during the phase non-conducting of the analog switch ASW1, the exposure value is computed by the circuit 4 based on that brightness information which took place just before the analog switch ASW1 becomes non-conducting, and the proper exposure is made by the display device 5 having the automatic exposure control function.

Next, assuming that the image is not in focus on the film plane 7, then the range finding circuit 1 produces an H level output signal at the R output terminal or the L output terminal certain time from the start of current to the range finding circuit 1, thereby the AF motor MT1 is energized. At the same time, the OR gate OR1 produces an H level output signal. Responsive to this signal, the second one-shot circuit OS2 produces a pulse which becomes H level for a prescribed time. Therefore, even if the output of the light metering circuit 3 is mixed with noise as induced by the current supply to the AF motor MT1, or similarly at the start of current to the range finding circuit 1, when a camera release is actuated at a time during non-conducting of the analog switch ASW1, that brightness information which occurred just before the transit to non-conducting is used for determining the shutter time or aperture value. Therefore, even if it happens that release actuation coincides with the time when the light metering circuit 3 is not operated normally by the transient drop of the voltage of the electrical power source or the battery BAT1 due to the start of current to the AF motor MT1, automatic exposure control is made based on that output of the light metering circuit 3 which occurred just before the current is supplied to the AF motor MT1. This makes it possible to prevent the exposure from becoming improper and, therefore, to assure that photographs are always accurately exposed.

As has been described above, in this embodiment, during the time interval from the moment at which the range finding circuit 3 or the AF motor MT1 has been supplied with electrical power to the moment at which the voltage of the electrical power source BAT1 restabilizes itself, the concurrent output of the light metering circuit 3 is prohibited from being used for determining the exposure because it is not accurately proportional to the object brightness. But that output of the light metering circuit 3 which occurred just before electrical power is supplied to the range finding circuit 3 or the AF motor MT1 as the drive source for the photographic lens 6, is used for that purpose after it has once been latched as analog information by using the analog switch ASW1 and the condenser C1. Next, another example of application of the invention to the camera is when the photographic information, just before the range finding circuit 1 and the AF motor are supplied with electrical power, is latched as digital information. This will next be described by reference to FIG. 3.

Figure 3:
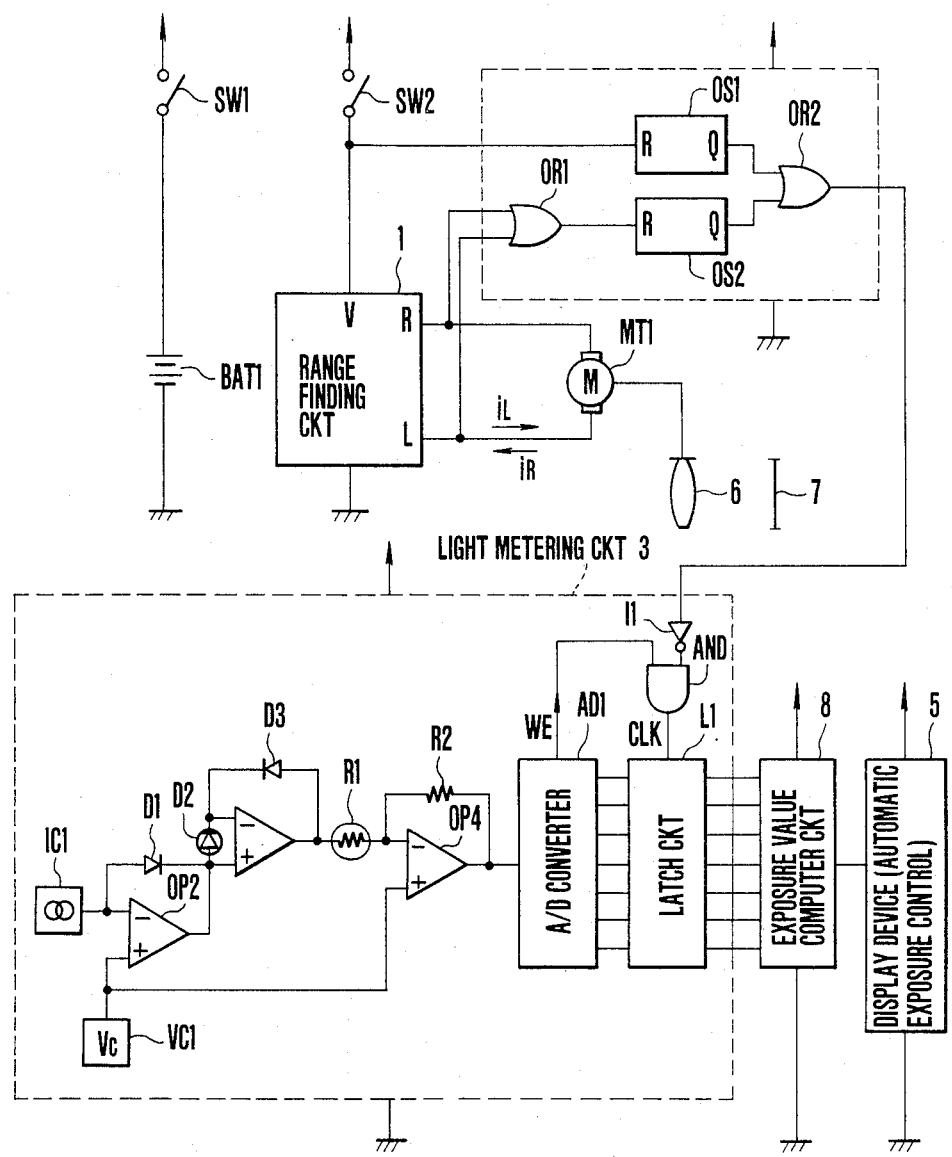
FIG. 3 is an electrical circuit diagram of another embodiment of the present invention applied to the camera in which the light metering circuit produces an output in the digital form.

FIG. 3 is an electrical circuit diagram, partly in block form, of a second embodiment of the invention where the same reference numerals have been employed to identify similar parts to those shown in FIG. 1, and their explanation is not given. The output of the operational amplifier OP4, which is proportional to the logarithm of the object brightness independent from the temperature, is applied to an A/D converter AD1. Each time the A/D conversion is completed, the A/D converter AD1 produces a timing pulse of which the rising edge is synchronous therewith at an output terminal WE. A latch circuit L1 responsive to the rising edge of a pulse at a CLK terminal thereof latches the output of the A/D converter AD1 and produces an output which is applied to the exposure value computer circuit 8. After that, the latch circuit L1 continues latching the same signal until the next rising edge of another pulse is applied to the CLK terminal thereof. The signal of the aforesaid OR gate OR2 is inverted by an inverter I1 having an output which is connected to one of two inputs of an AND gate AND, the other input which is connected to the output terminal WE of the A/D converter AD1. From the digital information representing the object brightness, the exposure value computer circuit 8 computes a shutter time or aperture value.

The operation of the second embodiment of the invention will next be described by reference to FIGS. 4A, 4LB, 4C and 4D. FIG. 4A is the waveform of the output of the operational amplifier OP4 constituting part of the light metering circuit 3. FIG. 4B is the waveform of the signal produced from the terminal WE of the A/D converter AD1. FIG. 4C is the waveform of the output of the OR gate OR2 applied to the inverter I1. FIG. 4D is the waveform of the output of the AND gate AND, indicating a timing when the output of the A/D converter AD1 is latched by the latch circuit L1. At first, since there has not been a first stroke on the release button and the manual mode is set, no electrical power is supplied to all the circuits.

Then, when the release button is pushed down a first stroke, the power supply control switch SW1 is turned on, thereby all the circuits except the range finding circuit 1 are supplied with electrical power. Therefore, as has been described in conjunction with the first embodiment, the light metering circuit 3 produces an output signal representing the temperature-independent value of the logarithm of the object brightness at the output of the operational amplifier OP4. This signal is converted to a digital signal by the A/D converter AD1. When A/D conversion is completed, a pulse of short duration is applied from the terminal WE of the A/D converter AD1 to one of the inputs of the AND gate AND. Since no electrical power is supplied to the range finding circuit 1, both the one-shots OS1 and OS2 produce L level signals, and the OR gate OR2 produces an L level output. Therefore, applied to the other input of the AND gate AND is an H level signal from the inverter I1. At the time of completion of the A/D conversion, therefore, the AND gate AND produces an H level signal. Thus, the rising pulse is applied to the terminal CLK of the latch circuit L1 so that the output of the A/D converter AD1 is latched by the latch circuit L1. The exposure value computer circuit 8, receptive of the output of the latch circuit L1, computes a shutter time or aperture value which is displayed by the display device 5 and in accordance with which the exposure is always accurately controlled.

Next, to switch the camera to the auto focus mode, when the mode selector switch SW2 is turned on, electrical power is supplied to the range finding circuit 1. Thereupon, as shown in FIG. 4A, the waveform of the output of the operational amplifier OP4 of the light metering circuit 3 is turbulent. But, meanwhile, as shown in FIG. 4C, the one-shot OS1 produces a pulse of predetermined duration which is applied through the OR gate OR2 to the inverter I1. By the output of the inverter I1, as shown in FIG. 4D, the AND gate AND is gated off. During the time when the one-shot OS1 produces the pulse, therefore, the L level signal continues to be applied to the terminal CLK of the latch circuit L1, hindering the latch circuit L1 from newly latching the signal of the A/D converter AD1. Thus, that signal of the A/D converter AD1, which occurred just before the production of the pulse from the one-shot OS1, remains latched in the latch circuit L1. It is, therefore, even at a time during the transient change of the voltage of the electrical power source just after the mode selector switch SW2 has been moved from the manual to the auto focus mode position that, despite the light metering circuit 3 providing an incorrect light value, correct exposure occurs because the exposure value is derived from that output of the light metering circuit 3 which occurred just before electrical power is supplied to the range finding circuit 1.

Next assuming that the photographic lens system 6 is judged by the range finding circuit 1 to form an image not in focus on the film plane 7, then an H level signal is produced from either one of the output terminals R and L of the range finding circuit 1, causing the AF motor MT1 to be supplied with electrical power. Then, the AF motor MT1 starts to rotate and drives the lens system 6. At the same time, the OR gate OR1 produces an H level signal. Responsive to this, as shown in FIG. 4C, the second one-shot OS2 and the OR gate OR2 change their outputs to H levels and maintain these levels for a predetermined period. Therefore, similar to the starting time of electrical power to the range finding circuit 1, it is during the predetermined period beginning with the start of electrical power to the AF motor MT1 that the output of the A/D converter AD1 is prevented from being latched in the latch circuit L1, but that signal of the A/D converter AD1 which occurred just before electrical power is supplied to the AF motor MT1 is left latched in.

Therefore, it is possible to insure that even during the time when the light metering circuit 3 provides an incorrect light value because of the sudden drop of the voltage of the battery BAT1 just after the AF motor MT1 is started, correct exposure can be obtained based on that light value which was obtained just before electrical power is supplied to the AF motor MT1.

Also, in the embodiments of the invention, the means for allowing the correct exposure value to be available even during the predetermined time beginning with the transit from unenergization to energization of the range finding circuit 1, is provided in the form of the latch circuit L1. But, this means may be otherwise formed. For example, when the A/D converting operation for the light value is controlled by using a micro computer, the clock pulses for use in A/D converting the light value may be hindered from being produced from the micro computer for that predetermined period, and the automatic exposure control is based on the light value. Another example is that the timing for the micro computer to absorb the light value is delayed by that predetermined period beginning with the start of electrical power supplied to the range finding circuit 1 so that automatic exposure control is prohibited from starting based on the signal produced from the light metering circuit 1 during that predetermined period (beginning with the start of electrical power to the range finding circuit 1 and terminating at the establishment of the stabilized condition of the battery BAT1 voltate).

Another modification example is that the automatic exposure control may be made based on that light value which is obtained in the predetermined period after transit from unenergization to energization of the range finding circuit 1, (in the period from the start of electrical power to the range finding circuit 1 to the moment at which the voltage of the battery BAT1 becomes stable).

Also, though, in the embodiments of the invention shown in FIGS. 1 and 3, since the drive source for moving the lens system 6 makes use of the AF motor MT1 of which the operation is controlled by the signal from the range finding circuit 1, the present invention is not confined thereto. For example, even in application to the camera in which the operation of the motor for driving motion of the lens system is controlled not by the signal from the range finding circuit, but by a manual switch, as the photographer desires, or the so-called power-focus camera, a similar advantage can be enjoyed.

Also, in the embodiments of the invention, during the predetermined time from the transit from the unenergization to the energization of the electric motor for driving motion of the automatic focusing lens, the automatic exposure control is prohibited from being made based on the output of the light metering circuit in such a way as not to latch the light value for that predetermined period, but is made based on that light value which occurred just before the start of electrical power supply to the electric motor for driving the motion of the automatic focusing lens.

As has been described above, according to the present invention, the camera in which the light metering circuit and either or both of the range finding circuit and the electric motor for driving motion of the lens are supplied with electrical power from the same source and the exposure is automatically controlled in accordance with the output of the light metering circuit, is provided with prohibiting means for prohibiting the automatic exposure control from being made based on the output of said light metering circuit during a predetermined period from the transit from the unenergization to the energization of said range finding circuit or said lens drive electric motor, thereby giving an advantage of preventing photographs of incorrect exposure from being taken which would otherwise result when the automatic exposure control is made based on the light value which is obtained from the light metering circuit during the period of lowering of the battery voltage due to the start of electrical power supply to the range finding circuit or the lens drive electric motor, and, therefore, of insuring that photographs of correct exposures can always be taken.

What is claimed is:

1. A camera system having an electric motor for driving a load member, comprising:
   (a) a light metering circuit;
   (b) an exposure control circuit for controlling exposure in accordance with the output of said light metering circuit;
   (c) an electrical power supply circuit for supplying electrical power to said light metering circuit and said motor from a common battery; and
   (d) prohibiting means for stopping the transfer of the output of said light metering circuit to said exposure control circuit for a prescribed time when current is supplied to said motor.

2. A camera system having an electric motor for driving a load member, comprising:
   (a) a light metering circuit for producing an output proportional to the brightness level of an object to be photographed;
   (b) a hold circuit having an input connected to the output of said light metering circuit and responsive to prohibition of the transfer of the output of said light metering circuit thereto for holding that output of said light metering circuit which has been transferred thereto before that prohibition until the output of said light metering circuit is allowed again to transfer;
   (c) an exposure control circuit for controlling an exposure in accordance with the output of said hold circuit;
   (d) an electrical power supply circuit for supplying electrical power to said light metering circuit and said motor from a common battery; and
   (e) prohibiting means for stopping the transfer of the output of said light meeting circuit to said hold circuit for a prescribed time when said motor is supplied with electrical power.

3. A camera system having an electric motor for driving a photographic lens, comprising:
   (a) a light metering circuit for producing a output proportional to the brightness level of an object to be photographed;
   (b) a hold circuit having an input connected to the output of said light metering circuit and responsive to prohibition of the transfer of the output of said light metering circuit thereto for holding that output of said light metering circuit which has been transferred thereto before that prohibition until the output of said light metering circuit is allowed again to transfer;
   (c) an exposure control circuit for controlling an exposure in accordance with the output of said hold circuit, said circuit being responsive to actuation of a camera release for initiating an exposure operation;
   (d) an electrical power supply circuit for supplying electrical power to said light metering circuit and said motor from a common battery; and (e) prohibiting means for stopping the transfer of the output of said light metering circuit to said hold circuit for a prescribed time when said motor is supplied with electrical power.

4. A camera system having a light metering circuit and a load circuit, comprising:
(a) a light metering circuit;
(b) an exposure control circuit for controlling exposure in accordance with the output of said light metering circuit;
(c) a power supply circuit for supplying electrical power to said light metering circuit and said load circuit from a common battery; and
(d) prohibiting means for stopping the transfer of the output of said light metering circuit to said exposure control circuit for a prescribed time when said load circuit is supplied with electrical power.

5. A camera system having a light metering circuit and a load circuit, comprising:
(a) a light metering circuit for producing an output proportional to the brightness level of an object to be photographed;
(b) a hold circuit having an input connected to the output of said light metering circuit and responsive to prohibition of the transfer of the output of said light metering circuit thereto for holding that output of said light metering circuit which has been transferred thereto before that prohibition until the output of said light metering circuit is allowed again to transfer;
(c) an exposure control circuit for controlling an exposure in accordance with the output of said hold circuit;
(d) a power supply circuit for supplying electrical power to said light metering circuit and said load circuit from a common battery; and
(e) prohibiting means for stopping the transfer of the output of said light metering circuit to said hold circuit for a prescribed time when said load circuit is supplied with electrical power.

6. A camera system having a light metering circuit and a load circuit, comprising:
(a) a light metering circuit for producing an output proportional to the brightness level of an object to be photographed;
(b) a hold circuit having an input connected to the output of said light metering circuit and responsive to prohibition of the transfer of the output of said light metering circuit thereto for holding that output of said light metering circuit which has been transferred thereto before that prohibition until the output of said light metering circuit is allowed again to transfer;
(c) an exposure control circuit for controlling an exposure in accordance with the output of said hold circuit, said circuit being responsive to actuation of a camera release for initiating an exposure operation;
(d) a power supply circuit for supplying electrical power to said light metering circuit and said load circuit from a common battery; and
(e) prohibiting means for stopping the transfer of the output of said light metering circuit to said hold circuit for a prescribed time when said load circuit is supplied with electrical power.

7. A camera system as in claim 4, 5 or 6 wherein said load circuit is a focus detecting circuit for detecting focus.

8. A camera system having a light metering circuit and a load circuit, comprising:
(a) a light metering circuit for producing an output proportional to the brightness level of an object to be photographed;
(b) an A/D converting circuit for converting the output of said light metering circuit by a prescribed period to renew the A/D converted value;
(c) an exposure control circuit for controlling an exposure in accordance with the output of said A/D converting circuit;
(d) a power supply circuit for supplying electrical power to said light metering circuit and said load circuit from a common battery; and
(e) a prohibiting circuit for prohibiting the renewing of the A/D converted value to be applied to said exposure control circuit for a prescribed time when said load is supplied with electrical power.

9. A camera system having a light metering circuit and a load circuit, comprising:
(a) a light metering circuit for producing an output proportional to the brightness level of an object to be photographed;
(b) an A/D converting circuit for converting the output of said light metering circuit by a prescribed period to renew the A/D converted value;
(c) a hold circuit receptive of a signal representing an A/D converted value by said A/D converting circuit for holding said received A/D converted value until another signal representing the next A/D converted value is applied thereto;
(d) an exposure control circuit for controlling an exposure in accordance with the A/D converted value held in said hold circuit, said circuit being responsive to actuation of a camera release for initiating an exposure operation;
(e) a power supply circuit for supplying electrical power to said light metering circuit and said load circuit from a common battery; and
(f) prohibiting means for stopping the transfer of the A/D converted value to said hold circuit for a prescribed time when said load circuit is supplied with electrical power.

10. A camera system as in claim 8 or 9 wherein said load circuit is an electric motor for driving a photographic lens.

11. A camera system as in claim 8 or 9 wherein said load circuit is a focus detecting circuit for performing focus detection.

* * * * *